(12) United States Patent
Williams et al.

(10) Patent No.: US 12,217,111 B2
(45) Date of Patent: Feb. 4, 2025

(54) SELF-POWERED ACTIVE RFID TAG

(71) Applicant: Hubbell Incorporated, Shelton, CT (US)

(72) Inventors: Michael Williams, Watertown, CT (US); Roy Itzler, Orange, CT (US)

(73) Assignee: Hubbell Incorporated, Shelton, CT (US)

(*) Notice: Subject to any disclaimer, the term of this patent is extended or adjusted under 35 U.S.C. 154(b) by 0 days.

(21) Appl. No.: 18/588,678

(22) Filed: Feb. 27, 2024

(65) Prior Publication Data

US 2024/0202481 A1    Jun. 20, 2024

Related U.S. Application Data

(63) Continuation of application No. 17/761,045, filed as application No. PCT/US2020/051729 on Sep. 21, 2020, now Pat. No. 11,941,470.

(60) Provisional application No. 62/903,139, filed on Sep. 20, 2019.

(51) Int. Cl.
    *G06K 19/07*    (2006.01)
(52) U.S. Cl.
    CPC ..... *G06K 19/0704* (2013.01); *G06K 19/0707* (2013.01); *G06K 19/0723* (2013.01)
(58) Field of Classification Search
    CPC ......... G06K 19/07074; G06K 19/0707; G06K 19/0723
    USPC .......................................................... 235/492
    See application file for complete search history.

(56) References Cited

U.S. PATENT DOCUMENTS

| 7,256,699 | B2 | 8/2007 | Tethrake et al. | |
|---|---|---|---|---|
| 2007/0159337 | A1 | 7/2007 | Tethrake et al. | |
| 2011/0227748 | A1* | 9/2011 | Schaible | F16P 3/147 340/686.6 |
| 2012/0062366 | A1 | 3/2012 | Pappu et al. | |
| 2012/0168521 | A1 | 7/2012 | Jones et al. | |
| 2013/0201006 | A1* | 8/2013 | Kummetz | G06K 7/10019 340/10.1 |
| 2014/0097254 | A1* | 4/2014 | Downie | G06K 19/0715 235/492 |
| 2014/0239881 | A1* | 8/2014 | Cassidy | H02J 7/0042 320/107 |
| 2021/0408827 | A1* | 12/2021 | Partovi | H02J 7/0013 |
| 2022/0344883 | A1* | 10/2022 | Misener | G06K 7/10237 |
| 2022/0383729 | A1* | 12/2022 | Trepanier | G08B 21/182 |

OTHER PUBLICATIONS

International Search Report and Written Opinion issued on Dec. 10, 2020, by the International Searching Authority in corresponding International Patent Application No. PCT/US2020/051729. (15 pages).

* cited by examiner

*Primary Examiner* — Michael G Lee
*Assistant Examiner* — David Tardif
(74) *Attorney, Agent, or Firm* — Robinson + Cole LLP (57) ABSTRACT

An electrical device includes an electrical cable and a connector coupled to the electrical cable. The connector is configured to receive electrical current from an external power source. The connector includes an RFID tag, and an electrical storing device configured to store electrical energy from the external power source and provide electrical energy to the RFID tag when the connector is disconnected from the external power source. The RFID tag transmits a signal independent of the connector being coupled to the external power source.

20 Claims, 7 Drawing Sheets

SELF-POWERED ACTIVE RFID TAG

RELATED APPLICATIONS

This application is a continuation of U.S. Non-Provisional patent application Ser. No. 17/761,045, filed Mar. 16, 2022, which is a 371 of PCT Patent Application No. PCT/US2020/051729, filed Sep. 21, 2020, which claims the benefit to U.S. Provisional Patent Application No. 62/903,139, filed on Sep. 20, 2019, the entire contents of which are incorporated herein by reference for all that is taught.

FIELD

The present disclosure relates to an electrical device and specifically to an electrical device with an active RFID tag capable of transmitting a signal regardless of whether the electrical device is receiving power.

BACKGROUND

Automated identification (auto-ID) is particularly useful in communicating information about physical objects to an inventory management system. For example, auto-ID automates the process of identifying physical objects. This is particularly useful to users who may save time over hand counting or manually recording the information (e.g., in a computer database).

A common type of auto-ID is a bar code, which can be scanned or read by a machine. An optical transducer, or similar device, can extract information (e.g., an identifying number) from the bar code and enter the information in a system. Similarly, optical character recognition (OCR) can be used by a computer to extract information from human readable text.

A problem with using a bar code reader on OCR is that both require a clear line of sight. Close proximity (e.g., within a few feet) may also be required. Other objects, as well as debris (e.g., dirt, smudging, etc.) can block or obscure the bar code or text, making reading the information difficult or impossible. To remedy the deficiencies of optical readers, readers instead can be configured to read radio waves. Radio frequency identification (RFID) allows radio waves to be used as a way to identify objects. Using RFID eliminates the direct line of sight requirement of optical readers, making RFID more useful, particularly when various obstructions exist.

SUMMARY

In one independent embodiment, an electrical device includes an electrical cable and a connector coupled to the electrical cable. The connector is configured to receive electrical current from an external power source. The connector includes an RFID tag, and an electrical storing device configured to store electrical energy from the external power source and provide electrical energy to the RFID tag when the connector is disconnected from the external power source. The RFID tag transmits a signal independent of the connector being coupled to the external power source.

In another embodiment, a connector for an electrical device includes an active RFID tag, and an electrical storing device electrically connected to the RFID tag and configured to store electrical energy from the external power source. The electrical storing device provides electrical energy to the RFID tag when the connector is disconnected from the external power source. The RFID tag transmitting a signal independent of the connector being coupled to the external power source.

Other independent aspects of the disclosure may become apparent by consideration of the detailed description, claims and accompanying drawings.

BRIEF DESCRIPTION OF THE DRAWINGS

FIG. 4 is a schematic view of the electrical device of FIG. 1, with no electrical current flowing through.

DETAILED DESCRIPTION

Before any independent embodiments of the disclosure are explained in detail, it is to be understood that the disclosure is not limited in its application to the details of construction and the arrangement of components set forth in the following description or illustrated in the following drawings. The disclosure is capable of other independent embodiments and of being practiced or of being carried out in various ways. Also, it is to be understood that the phraseology and terminology used herein is for the purpose of description and should not be regarded as limiting.

Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted", "connected", "supported", and "coupled" and variations thereof are used broadly and encompass both direct and indirect mountings, connections, supports, and couplings.

Relative terminology, such as, for example, "about", "approximately", "substantially", etc., used in connection with a quantity or condition would be understood by those of ordinary skill to be inclusive of the stated value and has the meaning dictated by the context (for example, the term includes at least the degree of error associated with the measurement of, tolerances (e.g., manufacturing, assembly, use, etc.) associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10% or more) of an indicated value.

Also, the functionality described herein as being performed by one component or structure may be performed by multiple components/structures in a distributed manner. Likewise, functionality performed by multiple components/ structure may be consolidated and performed by a single component or structure. Similarly, a component or structure described as performing particular functionality may also perform additional functionality not described herein. For example, a device or structure that is "configured" in a certain way is configured in at least that way but may also be configured in ways that are not listed.

In general, the present disclosure relates to a radio frequency identification (RFID) tag coupled to a device (e.g., an electrical device). The tag interacts with a reader in order to communicate to the reader information (e.g., an identification number) associated with the device.

Figure 1:
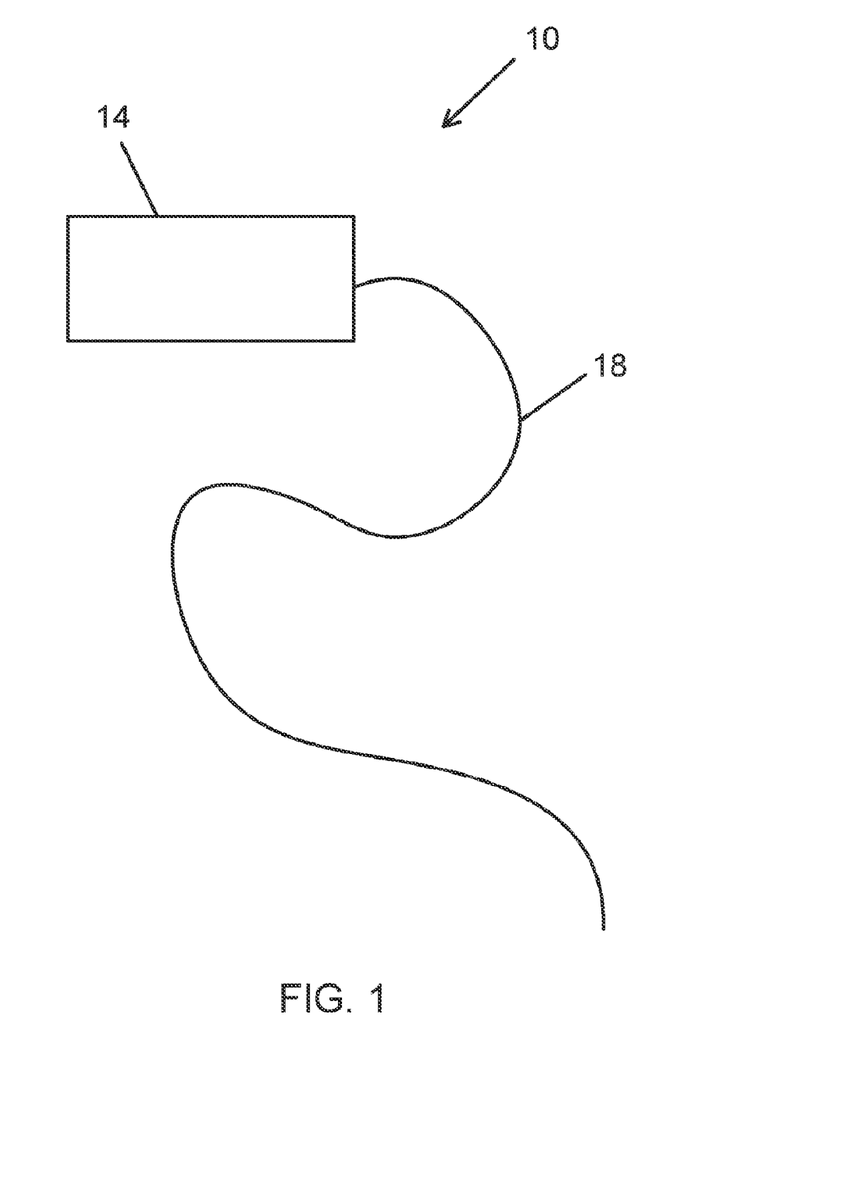
FIG. 1 is a schematic view on an electrical device.

As shown in FIG. 1, an electrical device 10 (e.g., an electrical cable) includes a connector 14 and a conductor 18 (e.g., an electrical cable). The connector 14 is removably coupled to an external power source 22 (see e.g., FIG. 4). The external power source 22 may be an electrical socket, a generator, a battery, or any similar device. The conductor 18 allows electrical current from the external power source 22 to flow through the connector 14.

Figure 2A:
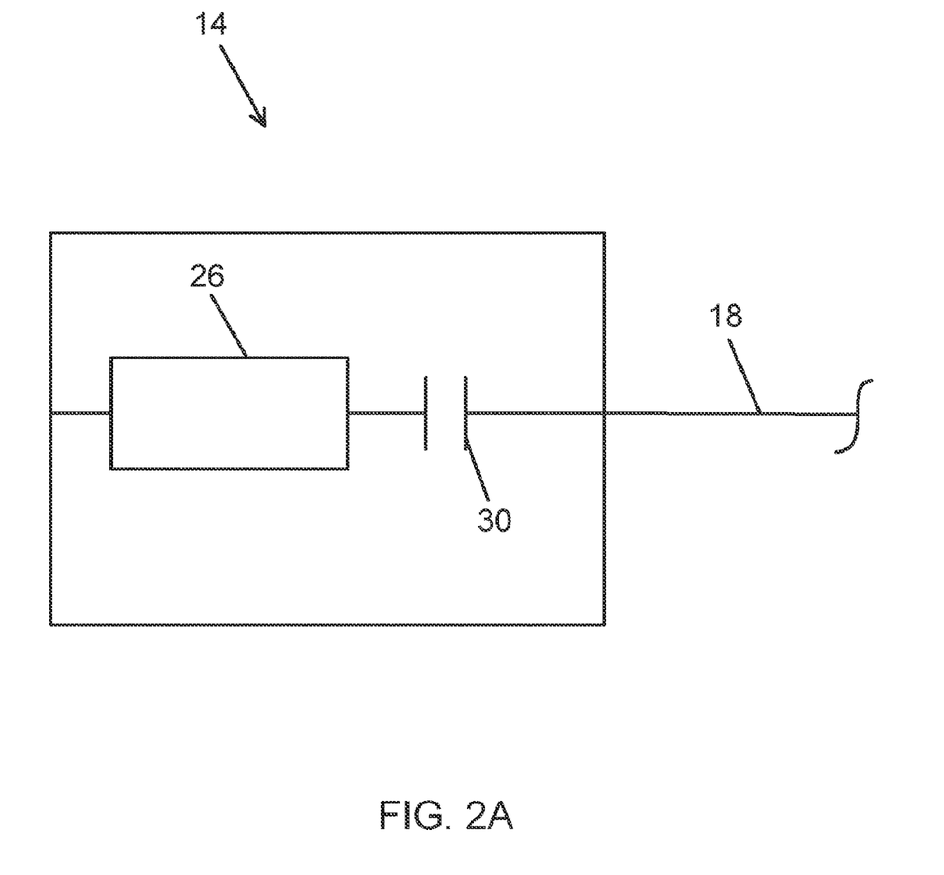
FIG. 2A is a schematic view of an interior of a first embodiment of the electrical device of FIG. 1.
Figure 2B:
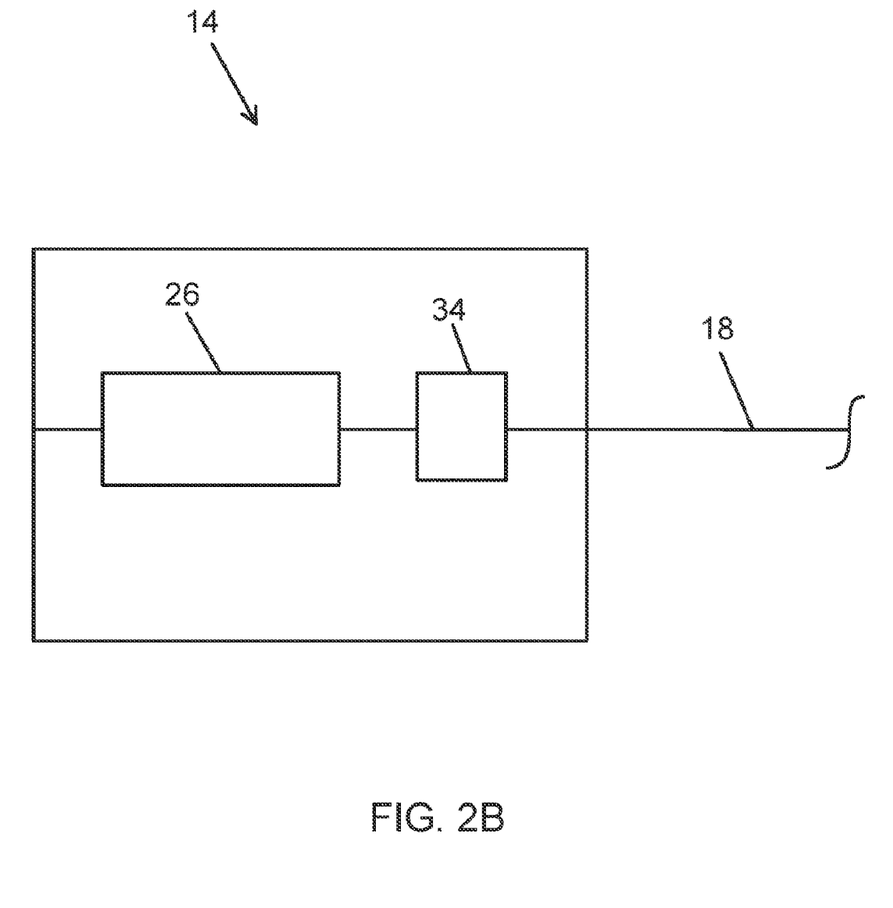
FIG. 2B is a schematic view of an interior of a second embodiment of the electrical device of FIG. 1.
Figure 2C:
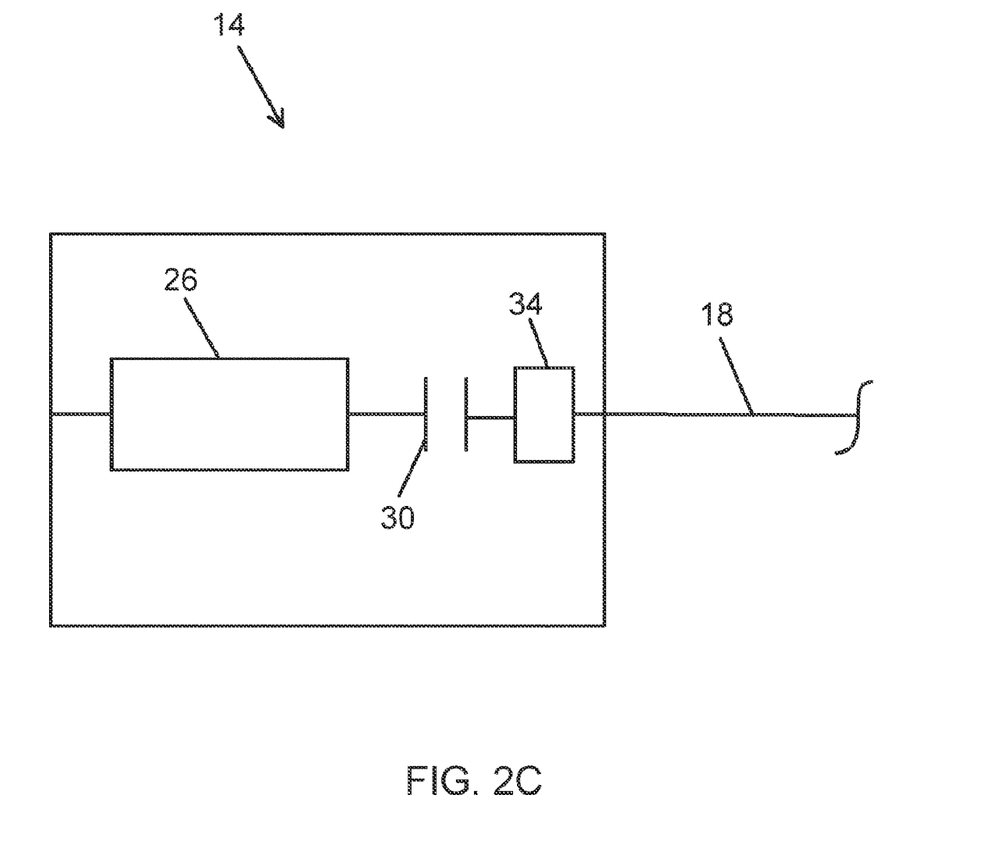
FIG. 2C is a schematic view of an interior of a third embodiment of the electrical device of FIG. 1.

As shown in FIGS. 2A-2C, the connector 14 includes an RFID tag 26 which includes an identification for the connector 14 (e.g., a unique serial number). The RFID tag 26 is in electrical proximity with the conductor 18, so that electrical current flows though the RFID tag 26 while the connector 14 is coupled to the external power source 22.

As shown in FIG. 2A, a capacitor 30, or other electrical storage device, is included in the connector 14 and electrically connected to the RFID tag 26. Electrical current flows through the capacitor 30 and creates an electric potential difference across the capacitor 30. The capacitor 30 is therefore able to store energy as the potential difference while the connector 14 is coupled to the external power source 22.

As shown in FIG. 2B, a battery 34 is included in the connector 14 instead of the capacitor 30 (see e.g., FIG. 2A). The battery 34 is electrically connected to the RFID tag 26. In the illustrated embodiment, the battery 34 is a rechargeable battery. Electrical current flows through the battery 34 and charges the battery 34. The rechargeable battery 34 is therefore able to store energy while the connector 14 is coupled to the external power source 22.

As shown in FIG. 2C, a capacitor 30 and a battery 34 are included in the connector 14, and are each electrically connected to the RFID tag 26. In the illustrated embodiment, the battery 34 is a rechargeable battery. Electrical current flows through the battery 34 and charges the battery 34. The rechargeable battery 34 is therefore able to store energy while the connector 14 is coupled to the external power source 22. Electrical current also flows through the capacitor 30 and creates an electric potential difference across the capacitor 30. The capacitor 30 is able to discharge to the battery 34 in the event of any power loss from the battery 34.

In the illustrated embodiment, the capacitor 30 and/or the battery 34 are original to the connector 14. In other embodiments, the capacitor 30 and/or the battery 34 may be retrofitted into an existing connector 14. The capacitor 30 and/or the battery 34 may replace an original strain relief portion or cord clamp (not shown) of the connector 14. The cord clamp without a RFID tag 26 may be removed and replaced with a similarly sized cord clamp that includes the RFID tag 26. In still other embodiments, the entire connector 14 may need to be replaced in order to retrofit a RFID tag 26 into the electrical device 10.

Figure 3:
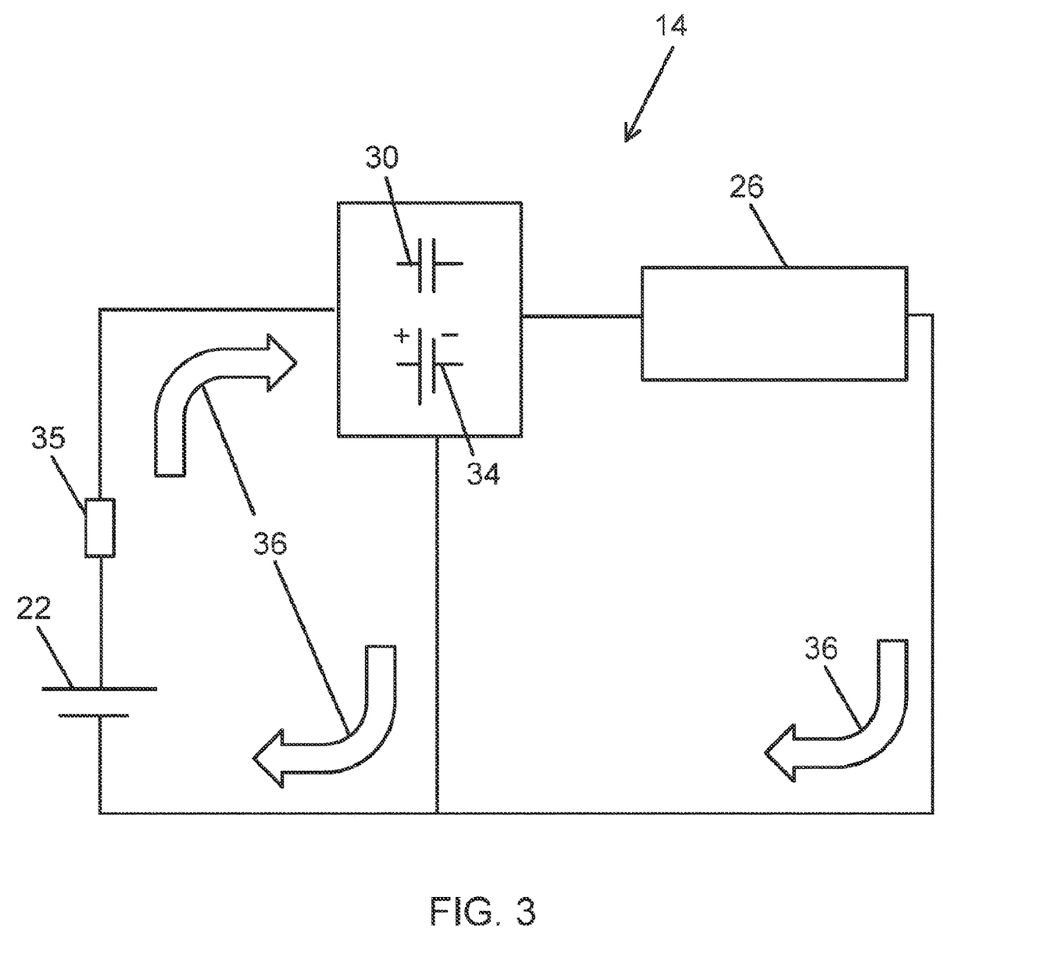
FIG. 3 is a schematic view of the electrical device of FIG. 1, receiving electrical current from an external source.

As shown in FIG. 3, while the connector 14 is coupled to the external power source 22, current flows through the connector 14. In the illustrated embodiment, the RFID tag 26 and the electrical storing device (e.g., the capacitor 30 and/or the battery 34) are arranged in parallel with respect to the external power source 22, and are together arranged in series with a resistor 35. The RFID tag 26 may have a resistance significantly higher than the electrical storing device 30, 34. Current 36 from the external power source 22 may primarily flow through the electrical storing device 30, 34, as its resistance is significantly less than the resistance of the RFID tag 26. The RFID tag 26 may still receive enough electrical current while the connector 14 is electrically connected to the external electrical device 22, so that the RFID tag 26 is powered (i.e., the comparative resistance may not be so high that no current can pass).

Figure 4:
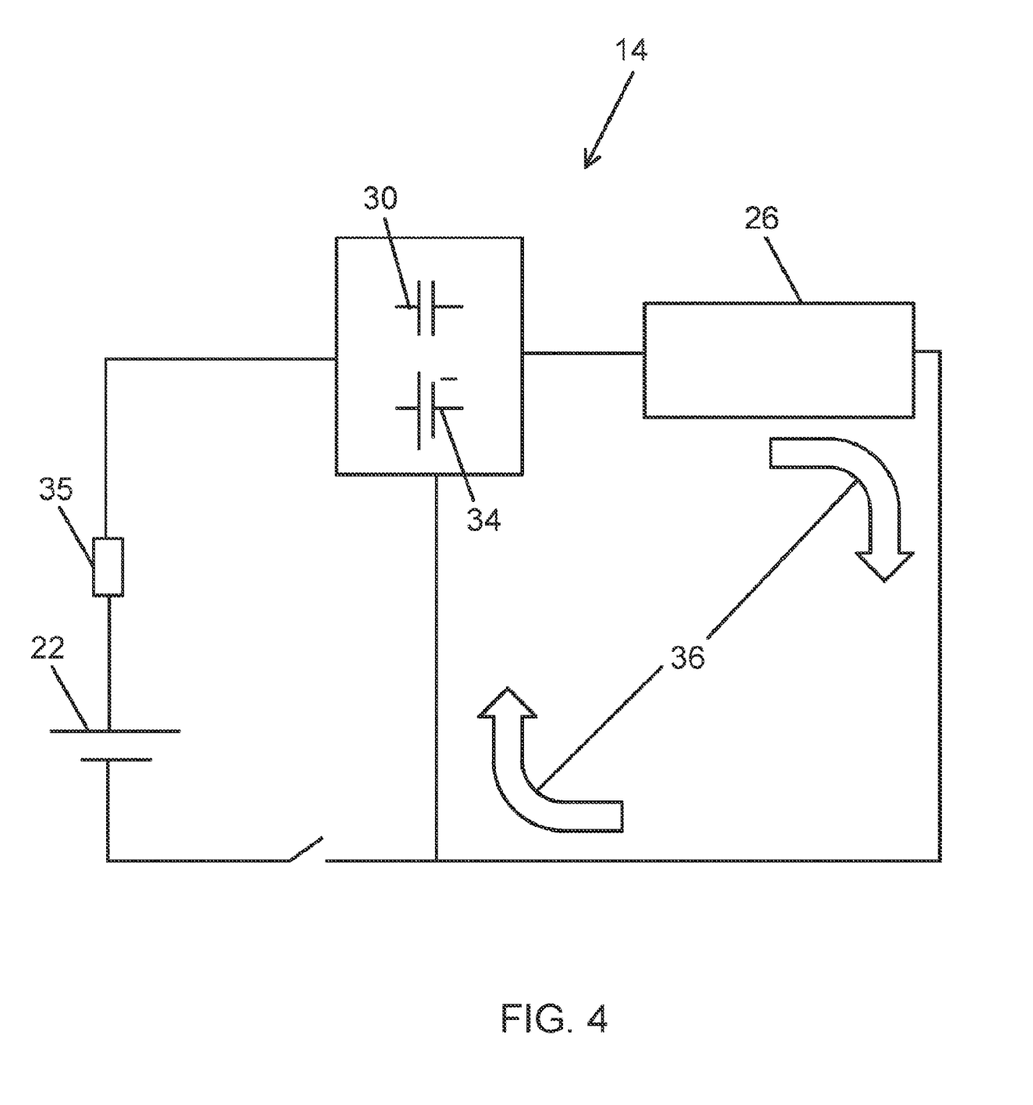

As shown in FIG. 4, once the connector 14 is disconnected from the external power source 22 (e.g., the connector 14 is unplugged from an electrical socket), the connector 14 no longer receives electrical current 36 from the external power source 22. In the illustrated embodiment, the RFID tag 26 is an active RFID tag. In other words, the RFID tag 26 requires a power source in order to transmit any signal. The power source also gives the RFID tags 26 greater power than is possible with a passive RFID tag, which improves the signal strength. The active tag 26 may be able to transmit its signal a greater distance. If an active tag is not directly plugged into a power source (e.g., the external power source 22, a battery, etc.) or if a battery is not supplied with the RFID tag, no signal is able to be transmitted when the power source is gone (e.g., it is unplugged).

In the illustrated embodiment, the electrical storing device 30, 34 is able to act as a power source for the RFID tag 26 for a limited amount of time. In some embodiments, the electrical storing device 30, 34 may be able to act as a power source for at least a week. In some embodiments, the electrical storing device 30, 34 may be able to act as a power source for at least a month. In some embodiments, electrical storing device 30, 34 may be able to act as a power source for at least six months. In some embodiments, electrical storing device 30, 34 may be able to act as a power source for at least a year. The RFID tag 26 and the electrical storing device 30, 34 are arranged in parallel. This creates a complete circuit between the electrical storing device 30, 34 and the RFID tag 26 when the connector 14 is disconnected from the external power source 22. Electrical energy stored in the electrical storing device 30, 34 is able to power the RFID tag 26 for a period of time, even when the connector 14 is not electrically connected to the external power source 22. This allows the RFID tag 26 to continue transmitting information.

The RFID tag 26 exhibits signal advantages of an active tag, without the requirements of including a bulky battery. Including the capacitor or small rechargeable battery allows the RFID tag 26 to continue to receive power, even without the external energy source 22. The stored electrical energy discharges and provides continued power to the RFID tag 26 so that the advantages of the active tag are realized even when the connector 14 is not powered. In the illustrated embodiment, the signal strength of the RFID tag 26 is substantially the same regardless of whether the connector 14 is receiving electrical power.

Figure 5:
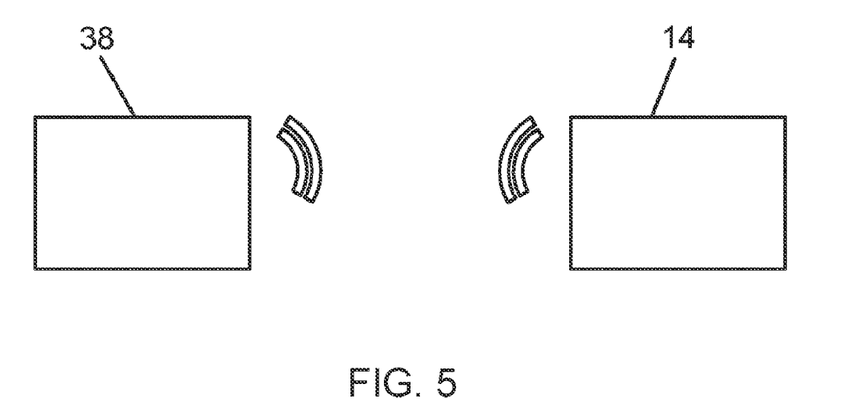
FIG. 5 is a schematic view of the electrical device of FIG. 1, in communication with a reader while no electrical current is flowing through the electrical device.

As shown in FIG. 5, the connector 14 is in communication with a receiver 38. In the illustrated embodiment, the receiver 38 and the connector 14 communicate exclusively through radio frequency (i.e., the receiver 38 communicates with the RFID tag 26). When the connector 14 is disconnected from the external energy source 22, the electrical storing device 30, 34 continues to provide power to the RFID tag 26, so that communication with the receiver 38 may continue for a limited amount of time (e.g., until the stored energy in exhausted). The connector 14 may continue to provide a stronger signal that is readable by the receiver 38 even when the connector 14 is unplugged. This allows a user to continue to track the connector 14 (e.g., through the RFID tag 26) when the electrical device 10 is being transported between locations. In other embodiments, the connector 14 may include Bluetooth connectivity, GPS, or any other means of wireless communication in addition to the RFID tag 26. These additional means of wireless communication may be similarly powered in order to allow them to continue to operate even when the connector 14 does not receive electrical current.

Figure 6:
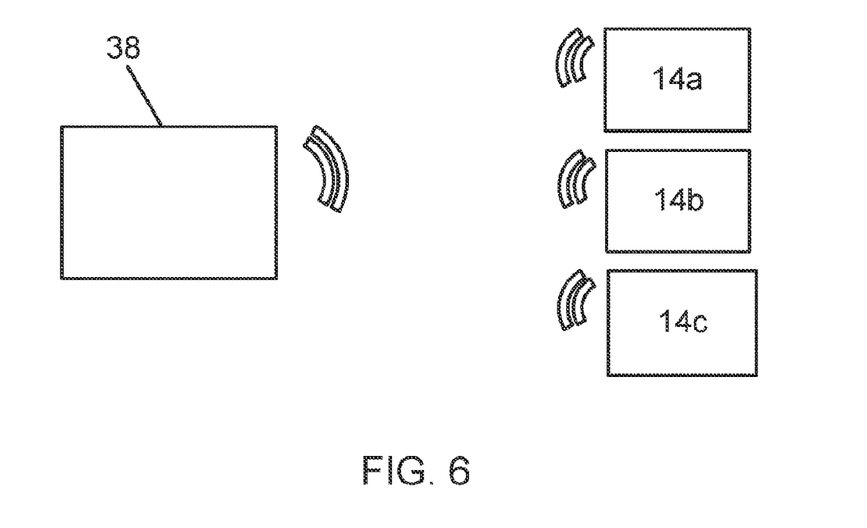
FIG. 6 is a schematic view of a multiple electrical devices of FIG. 1, in communication with a reader while no electrical current is flowing through any electrical device.

As shown in FIG. 6, the receiver 38 is in communication with multiple connectors 14a-14c, each with an RFID tag 26 as described above. When these connectors 14 are disconnected from their respective external power source 22, the respective electrical storing device 30, 34 in each connector 14a-14c provide electrical current to the RFID tags 26. This allows the individual RFID tags 26 to produce a sufficiently strong signal (e.g., of an active tag) so that the receiver 38 may differentiate between the signals. The receiver 38 is able to identify multiple RFID tags 26 grouped closely together (e.g., when multiple electrical devices 10 are carried together).

The embodiment(s) described above and illustrated in the figures are presented by way of example only and are not intended as a limitation upon the concepts and principles of the present disclosure. As such, it will be appreciated that variations and modifications to the elements and their configuration and/or arrangement exist within the spirit and scope of one or more independent aspects as described.

One or more independent features and/or independent advantages of the present disclosure may be set forth in the claims.

What is claimed:

1. An electrical device comprising:
    an electrical cable configured to removably connect to an external power source; and
    a connector coupled to the electrical cable and configured to receive electrical current from the external power source, the connector including,
        an RFID tag, and
        an electrical storing device configured to store electrical energy from the external power source and provide electrical energy to the RFID tag when the connector is disconnected from the external power source;
    wherein the RFID tag transmits a signal independent of the connector being coupled to the external power source; and
    wherein an impedance of the electrical storing device is less than an impedance of the RFID tag.

2. The electrical device of claim 1, wherein the RFID tag includes a unique identifier.

3. The electrical device of claim 1, wherein the signal from the RFID tag is substantially the same regardless of whether the connector receives electrical current from an external power source.

4. The electrical device of claim 1, wherein the electrical storing device includes a capacitor and a rechargeable battery arranged in series with one another.

5. The electrical device of claim 1, wherein the RFID tag and the electrical storing device are connected in parallel.

6. The electrical device of claim 1, wherein the electrical storing device is retrofit into an existing connector.

7. A method of outputting a signal from an RFID tag, the method comprising:
    connecting an electrical device to an external power source, wherein,
        the electrical device includes a connector and an electrical cable configured to convey electrical energy from the external power source to the connector, and
        the connector includes an electrical storage device configured to store electrical energy from the external power source;
    outputting a first wireless signal from an RFID tag of the electrical device while the electrical device is connected to the external power source;
    disconnecting the electrical device from the external power source; and
    outputting a second wireless signal from the RFID tag while the electrical device is disconnected to the external power source;
    wherein an impedance of the electrical storing device is less than an impedance of the RFID tag.

8. The method of claim 7, wherein a strength of the first wireless signal is the same as a strength of the second wireless signal.

9. The method of claim 7, further comprising receiving the first wireless signal and the second wireless signal on a receiver wirelessly connected to the RFID tag, wherein the receiver is configured to communicate with multiple RFID tags.

10. The method of claim 9, wherein the first wireless signal and the second wireless signal are the same and are unique from any other wireless signal received by the receiver.

11. The method of claim 7, wherein the electrical storing device includes a capacitor and a rechargeable battery arranged in series with one another.

12. The method of claim 11, wherein:
    after connecting the electrical device to the external power source, the rechargeable battery receives electrical energy from the external power source; and
    after disconnecting the electrical device to the external power source, the rechargeable battery receives electrical energy from the capacitor.

13. The method of claim 7, wherein the RFID tag and the electrical storing device are connected in parallel.

14. The method of claim 7, further comprising retrofitting the electrical storing device into an existing connector.

15. A connector for an electrical device, the connector comprising:
    an RFID tag configured to transmit a wireless signal, wherein the RFID tag is electrically coupled to a conductor to receive electrical energy from an external power source; and
    an electrical storing device electrically connected to the RFID tag;
    wherein:
        the connector is configured to be selectively connected to an external power source via a conductor,
        the RFID tag is configured to receive electrical energy from the electrical storing device when the connector is disconnected from the external power source,
        an impedance of the electrical storing device is less than an impedance of the RFID tag
        the RFID tag is configured to transmit the wireless signal independent of being connected to the external power source.

16. The connector of claim 15, wherein the electrical storing device includes a capacitor and a rechargeable battery arranged in series with one another.

17. The connector of claim 15, wherein the RFID tag and the electrical storing device are connected in parallel.

18. The connector of claim 15, wherein the RFID tag includes a unique identifier.

19. The connector of claim 15, wherein the wireless signal from the RFID tag is substantially the same regardless of whether the connector receives electrical current from an external power source.

20. The connector of claim 15, wherein the electrical storing device is retrofit into an existing connector.

* * * * *